Figure 1:
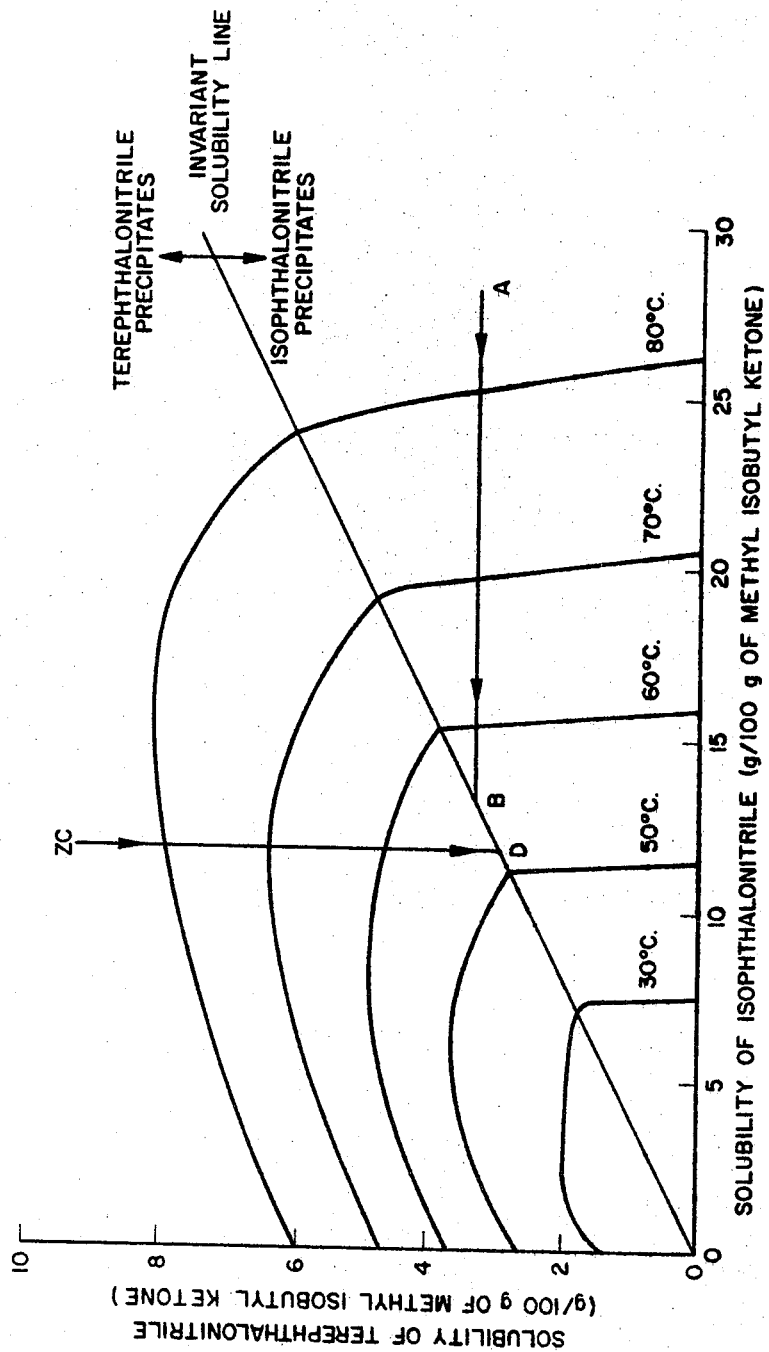

SOLUBILITY OF PHTHALONITRILE ISOMERS IN METHYL ISOBUTYL KETONE

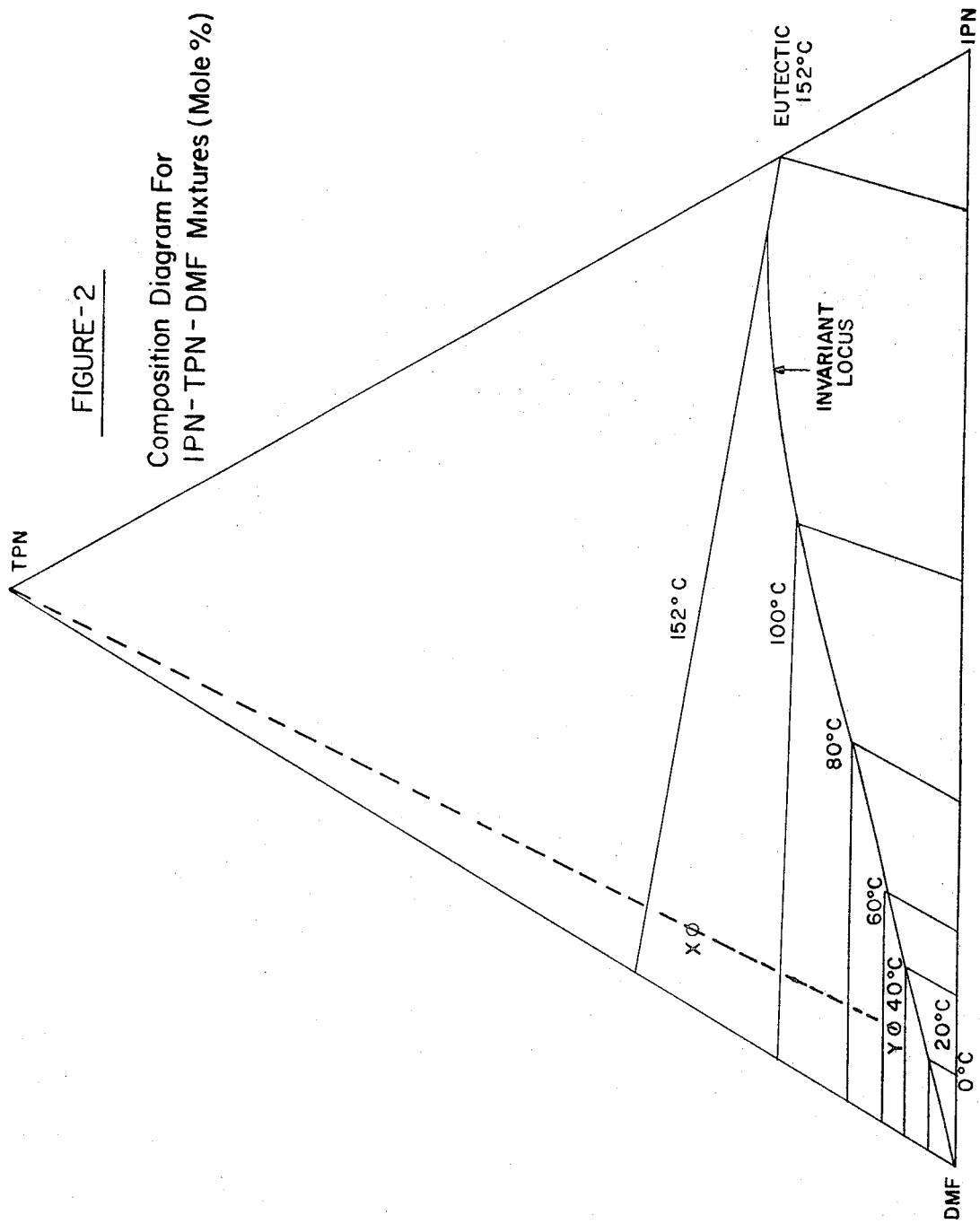

United States Patent Office 3,406,193
Patented Oct. 15, 1968

3,406,193
SEPARATION OF ISOPHTHALONITRILE AND TEREPHTHALONITRILE MIXTURES BY TREATMENT WITH DIMETHYL FORMAMIDE OR METHYL ISOBUTYL KETONE
Roger M. Butler, 1235 Glen Douglas Drive, and Leander Burton Simpson, 1011 Edgewater Court, both of Sarnia, Ontario, Canada
Filed June 20, 1966, Ser. No. 558,934
9 Claims. (Cl. 260—465)

This invention relates to the separation of phthalonitriles, specifically isophthalonitrile and terephthalonitrile from mixtures thereof. More particularly, this invention relates to a process for the separation of isophthalonitrile and terephthalonitrile from mixtures thereof, by solvent recrystallization, wherein the solvent preferentially dissolves one of the phthalonitriles.

Phthalonitriles are gaining widespread use as chemical intermediates in the production of fibers and plastics. For example, the phthalonitriles may be converted to diamines, by hydrogenation, and used in the preparation of nylon resin; or, further converted to isocyanates for use in urethane production or as curing agents for epoxy resins. Additionally, phthalonitriles may be hydrolyzed to prepare less readily available and valuable chemicals, e.g. phthalic or benzoic acids.

Phthalonitriles are normally prepared by the vapor phase partial oxidation of alkyl substituted benzenes in the presence of ammonia, air, and a suitable catalyst, i.e., ammoxidation process. Xylene feedstocks are particularly preferred in this reaction and produce corresponding nitrile products. When a single pure isomer, e.g. p-xylene, is converted to its corresponding nitrile, e.g. terephthalonitrile, the recovery and purification of the nitrile product can be carried out with little difficulty. However, conventional methods for the preparation of xylenes usually result in mixtures of the o-, p-, and m-xylenes. Although o-xylene can be rather substantially removed, the m- and p-isomers cannot be substantially separated without cumbersome and expensive procedures, such as fractional crystallization. Accordingly, commercially available m- or p-xylene will frequently contain proportions of the other isomer. Consequently, conversion of xylenes to nitriles will result in the preparation of a mixture of isophthalonitrile and terephthalonitrile. The nitriles are solids at room temperature, isophthalonitrile melting at about 162° C., terephthalonitrile at about 228° C. Because of their relatively high melting points, separation and purification of this mixture has been relatively difficult. Solvent recrystallization has been employed; however, some problems have developed, such as: use of aqueous solvents causes hydrolysis of the nitriles, clogging filter cakes, and low yields. It has now been discovered that by using the particular solvents of this invention, substantially pure nitriles may be recovered in yields approaching 100% of theoretical, without the problems attendant with the use of prior art solvents.

In accordance with this invention, therefore, the separation of phthalonitriles, i.e. terephthalonitrile and isophthalonitrile, is effected by treating a mixture of the phthalonitriles with a solvent selected from the group consisting of methyl isobutyl ketone and dimethyl formamide, in each of which terephthalonitrile is the less soluble of the two phthalonitriles. The resulting solution is concentrated or cooled, usually causing the less soluble nitrile to crystallize. The precipitate is then recovered and either washed or recrystallized from fresh solvent for further purification if desired.

In general, the solvent must be such that the ratio of phthalonitrile solubilities on the invariant locus differs from the ratio of the two components of the phthalonitrile mixture, otherwise no separation can be obtained. On the invariant locus the solution is saturated with respect to both terephthalonitrile and isophthalonitrile and further cooling or concentration will result in co-precipitation of the phthalonitriles in a fixed proportion. Further, the solvent is preferably anhydrous, i.e. to prevent hydrolysis of the nitriles to iso- or terephthalic acids, and should be usable over a wide temperature range. The ability of a solvent to be cooled over a wide temperature range allows the processing of a greater amount of material. The usable temperature range of any solvent may be broadly characterized as that temperature range in which the solvent remains a liquid. Since both methyl isobutyl ketone and dimethyl formamide possess significantly higher boiling points, i.e. 117° C. and 152° C., respectively, and generally increased solubilities over prior art solvents, these solvents are materially superior over solvents previously employed.

Additionally, the solubility of one phthalonitrile relative to the other, at various temperatures, is of particular importance. Obviously, a solvent with greater selectivity for one of the phthalonitriles will allow a better separation. Thus, if the amount of solvent to be utilized in the operation is minimized, it will be desirable to operate at higher temperatures. Preferred solvents, then, should exhibit high solubility ratios at high temperatures. Table I below illustrates the solubility and solubility ratio of iso- and terephthalonitrile in various solvents at various temperatures.

TABLE I

| Solvent | Temp., °C. | Solubility of phthalonitriles, mole/100 mole solvent | | Ratio |
|---|---|---|---|---|
| | | Iso- | Tere- | |
| Methyl isobutyl ketone | 30 | 5.50 | 1.21 | 4.6 |
| | 50 | 9.25 | 2.13 | 4.4 |
| | 70 | 14.80 | 3.59 | 4.1 |
| | 90 | 23.20 | 5.69 | 4.1 |
| | [1]117 | 39.5 | 10.1 | 3.9 |
| Dimethyl Formamide | 30 | 10.75 | 3.19 | 3.4 |
| | 50 | 19.50 | 5.68 | 3.4 |
| | 70 | 32.60 | 9.30 | 3.5 |
| | 90 | 55.30 | 14.75 | 3.8 |
| Acetone | 30 | 4.78 | 1.43 | 3.3 |
| | 50 | 7.58 | 2.64 | 2.9 |
| | 70 | 11.82 | 4.67 | 2.5 |
| | 90 | 18.01 | 7.82 | 2.3 |
| Methyl ethyl ketone | 30 | 6.28 | 1.54 | 4.1 |
| | 50 | 9.80 | 2.68 | 3.7 |
| | 70 | 14.62 | 4.56 | 3.2 |
| | [1]80 | 17.4 | 5.8 | 3.0 |
| Acetic acid | 30 | 2.08 | 0.67 | 3.1 |
| | 50 | 4.10 | 1.18 | 3.5 |
| | 70 | 7.75 | 1.98 | 3.9 |
| | 90 | 12.90 | 3.05 | 4.2 |

[1] B.P.

It is readily apparent that the highest solubility ratio exists for methyl isobutyl ketone. Further, the solubility ratio at increasing temperatures, for methyl isobutyl ketone, decreases at a much slower rate than for the other solvents. Thus, the separation of phthalonitriles in methyl isobutyl ketone is considerably better than for the prior art solvents listed. It should be noted that as the solvent changes from acetone to methyl ethyl ketone to methyl isobutyl ketone, the solubility of isophthalonitrile increases at the various temperatures. The solubility of terephthalonitrile likewise increases when changing from acetone to methyl ethyl ketone. However, quite unexpectedly, the solubility of terephthalonitrile in methyl isobutyl ketone sharply decreases to a value below that for acetone. If not for this factor, methyl isobutyl ketone would possess properties normally to be expected in a series of compounds with increasing carbon number. This decreased solubility for terephthalonitrile results in an unexpectedly high solubility ratio for methyl isobutyl ketone, which, in turn, results in phthalonitrile separations of exceedingly high quality and quantity.

With regard to dimethyl formamide, the solubility ratio increases with increasing temperature. Thus, although the solubility ratio for dimethyl formamide is approximately the same as for previously known solvents, particular advantages accrue in the use of dimethyl formamide due to the significantly greater solubility of both isophthalonitrile and terephthalonitrile in this solvent. Thus, considerably less dimethyl formamide is required to effect the same degree of separation than for previously used solvents. The combination of high solubility for the phthalonitriles and large usable temperature range makes dimethyl formamide a particularly good solvent.

Phthalonitriles are normally prepared by the ammoxidation of xylenes. The reaction is conducted in the presence of about 2 to 10 moles of ammonia and 1.5 to 20 moles of oxygen per mole of xylene. A supported variable valent metal oxide, such as the oxides of vanadium, chromium, molybdenum, tungsten, etc., or combinations thereof, may be advantageously used as a catalyst. The reaction is conducted at temperatures of about 350–600° C., the vaporous reaction product being cooled to precipitate the solid phthalonitriles. Normally, although not critical, the tolunitriles are then removed by steam distillation and sublimation. Unreacted xylene, along with tolunitriles, are also removed, usually by solvent extraction, e.g. petroleum ether. The remaining mixture consists essentially of isophthalonitrile and terephthalonitrile. The mixture is then treated with either methyl isobutyl ketone or dimethyl formamide to effect separation. The mixture may be completely dissolved and then concentrated to crystallize out the less soluble constituent. Alternatively, the mixture may be treated with sufficient solvent to leach away one of the constituents, usually the more soluble isophthalonitrile, thereby leaving the other nitrile as a substantially pure solid.

The phthalonitrile mixture to be purified will normally reflect the xylene mixture utilized in the ammoxidation reaction. Economic factors, i.e. cost of purifying a xylene stream as against cost of purifying a phthalonitrile mixture, will usually determine the resulting molar ratio of isophthalonitrile/terephthalonitrile after ammoxidation. Ordinarily, terephthalonitrile will crystallize from solutions containing an isophthalonitrile/terephthalonitrile molar ratio of less than about 4/1. However, the efficiency and ease of purification will increase as the terephthalonitrile concentration increases, i.e. the isophthalonitrile/terephthalonitrile ratio decreases. Consequently, it will be desirable to operate at an isophthalonitrile/terephthalonitrile molar ratio of about 2/1; and, depending on economic factors, at lower isophthalonitrile/terephthalonitrile molar ratios, i.e. 1/1. When it is desirable to crystallize out isophthalonitrile the isophthalonitrile/terephthalonitrile ratio is preferably at least about 4/1, more preferably 5/1, most preferably about 9/1.

Operating temperatures will vary with the isophthalonitrile/terephthalonitrile molar ratio. However, when utilizing an isophthalonitrile/terephthalonitrile ratio of about 2/1 and a methyl isobutyl ketone solvent, solution of the phthalonitrile mixture may preferably be effected in a temperature range of about 50–130° C. However, operating at the low or high limits will result in dilute solutions or highly concentrated solutions, respectively; the latter being somewhat more difficult to purify because of the more concentrated mother liquor remaining within the filter cake. Thus, it will be more preferable to dissolve the mixture at temperatures of about 80–100° C. Crystallization by cooling may be effected at temperatures ranging from about 35–110° C., more preferably about 60–85° C. With the same isophthalonitrile/terephthalonitrile molar ratio and dimethyl formamide as the solvent, solution may preferably be carried out at about 40–152° C., and more preferably at about 75–120° C., for the same reasons as outlined above. Crystallization by cooling may be effected at temperatures of about 20–115° C., more preferably 60–100° C. As the isophthalonitrile/terephthalonitrile molar ratio decreases, i.e. increasing terephthalonitrile content, the temperature ranges will widen, further simplifying the separation. It will be obvious to one skilled in the art to recognize the optimum temperature ranges when other isophthalonitrile/terephthalonitrile molar ratios are employed. While the isophthalonitrile/terephthalonitrile mixture may be treated with the solvent and then heated to dissolve the phthalonitriles, it will usually be preferable to treat the phthalonitrile mixture with solvent that is at a higher temperature than the mixture, i.e. about 20° C. higher, preferably 30° C., more preferably about 50° C.

The precipitated phthalonitrile may be recovered by settling and decanting, filtration, centrifugation, and the like. The precipitate is preferably washed with fresh solvent to remove traces of entrained liquids. The precipitate may then be used as is or recrystallized one or more times, one to six times, for further purification; with adequate washing no additional recrystallization is required.

The following examples will further serve to illustrate the process of this invention. However, no limitations are to be implied other than those incorporated in the appended claims.

Example 1

A mixture (2.0 g.) containing 50 wt. percent isophthalonitrile and 50 wt. percent terephthalonitrile whose melting range was 156–197° C., was dissolved in 12.8 g. of methyl isobutyl ketone at approximately 95° C. The solution was slowly cooled to 50° C., by which time a precipitate had formed which accounted for 100% of the terephthalonitrile theoretically possible to recover. This was removed by filtration, washed with fresh cold methyl isobutyl ketone and dried. Recrystallization from methyl isobutyl ketone gave a material melting at 224.1–225.6° C., indicating nearly pure terephthalonitrile.

Example 2

A 2.00 g. mixture comprising 50 wt. percent each of isophthalonitrile and terephthalonitrile with a melting range of 157–206° C. was dissolved in methyl isobutyl ketone. The solution was cooled to 50° C., filtered and 0.6010 g. of product with a melting point of 212.1–217.0° C. was recovered. This corresponded to 60% of the originally present terephthalonitrile and 100% of the theoretically possible recovery based on the composition-temperature diagram (FIGURE 1). The product was then recrystallized from methyl isobutyl ketone, filtered at 50° C. and 0.4250 g. of product recovered with a melting point of 224.1–225.6° C. This corresponded to 71% of the initial product and thus 71% of the theoretical recovery. Elemental analysis for carbon, hydrogen, and nitrogen showed 74.1, 3.41, and 22.2 as compared to expected values of 74.99, 3.15, and 21.87, respectively.

Example 3

The following table indicates the effect of successive recrystallizations from methyl isobutyl ketone on the purity of terephthalonitrile. After the initial recrystallization and wash, four additional recrystallizations were conducted to determine relative product purity after each cycle. The table shows clearly that excellent results were achieved even after the first recrystallization.

TABLE II.—SUCCESSIVE RECRYSTALLIZATION OF TEREPHTHALONITRILE FROM METHYL ISOBUTYL KETONE

| Operation | Wt. of TPN[1] (g.) | Wt. of MIBK[2] (g.) | TPN recovered (g.) | Recovery[3] (percent) | Vol. of rinse (ml.) | IMP[4] (° C.) | FMP (° C.) | Elemental analyses[5] (wt. percent) | | |
|---|---|---|---|---|---|---|---|---|---|---|
| | | | | | | | | Carbon | Hydrogen | Nitrogen |
| (*) | | | | | | | | 76.1 | 3.45 | 22.0 |
| 1 | 50 | 664.3 | 45.7 | 91.4 | 50 | 226.8 | 228.6 | 75.8 | 3.55 | 22.1 |
| 2 | 45.5 | 611.4 | 41.9 | 91.7 | 50 | 227.1 | 228.8 | 76.0 | 3.73 | 22.3 |
| | | | | | | | | 75.7 | 3.70 | 21.5 |
| 3 | 41.7 | 551.0 | 38.5 | 91.9 | 50 | 227.7 | 229.0 | 74.3 | 3.31 | 22.6 |
| | | | | | | | | 74.5 | 3.36 | 21.9 |
| 4 | 38.3 | 511.5 | 35.2 | 91.9 | 60 | 227.6 | 228.6 | 75.5 | 3.26 | 22.4 |
| | | | | | | | | 75.8 | 3.20 | 22.0 |
| 5 | 35.2 | 467.8 | 32.3 | 91.7 | 60 | 227.3 | 228.6 | 75.0 | 3.70 | 22.7 |
| | | | | | | | | 75.1 | 3.67 | 22.4 |

[1] TPN—Terephthalonitrile.
[2] MIBK—Methyl Isobutyl Ketone.
[3] Material dissolved at 100° C. and filtered at −10° C. Washed also at −10° C.
[4] IMP—Initial melting point; FMP—final melting point.
[5] Expected values: C=74.99, H=3.61, N=21.87.
* Original at 225° C.

Example 4

FIGURE 1 illustrates a composition-temperature diagram for terephthalonitrile and isophthalonitrile in methyl isobutyl ketone. Solutions with phthalonitrile concentrations falling above the invariant line will crystallize out terephthalonitrile upon cooling or concentration. Solutions with phthalonitrile concentrations below the invariant line will crystallize out isophthalonitrile upon cooling or concentration. For example, a solution containing composition C may be cooled along line CD precipitating terephthalonitrile only in an amount equal to C minus D. At D the invariant composition will precipitate. Similarly, a solution of concentration A may be cooled along line AB, causing isophthalonitrile, only, to precipitate in an amount equal to A minus B. Again, at point B, the invariant composition will begin to precipitate. The quantities A minus B and C minus D represent 100% of the theoretical possible recovery of pure product.

Example 5

A mixture of 8.0 g. terephthalonitrile and 2.0 g. isophthalonitrile was dissolved in 10.4 g. of dimethyl formamide. The mixture was heated and complete solution took place at 130° C. The solution was cooled to 50° C. and filtered through a 100 ml. sintered glas filter funnel which had previously been heated to 50° C. The liquid was forced through the filter by means of a small air pressure. 6.8 g. of crystallized product were obtained after the filter cake had been dried. This compares with an expected weight of recovered terephthalonitrile of 6.9 g. and, therefore, a recovery of 98% of the theoretical. The melting point of the recovered product was 226.8–228° C., indicating a purity of about 98%.

FIGURE 2 is a ternary composition diagram for isophthalonitrile-terephthalonitrile-dimethyl formamide mixtures. Points X and Y indicate the initial and final solutions in this example.

Example 6

Table III compares the efficiency of methyl isobutyl ketone and methyl ethyl ketone as solvents in this process. A 100 g. mixture, containing 65 g. isophthalonitrile and 35 g. terephthalonitrile is dissolved in each solvent at the boiling point of the solvent. The solution is then cooled to precipitate the maximum amount of terephthalonitrile, which is separated by filtration.

TABLE III

| Solvent | Solution temp., ° C. | Wt. solvent, grams | Crystallization temp., ° C. | Terephthalonitrile recovered, percent terephthalonitrile in feed |
|---|---|---|---|---|
| Methyl isobutyl ketone | 117 | 271 | 81 | 55.5 |
| Methyl ethyl ketone | 80 | 337 | 55 | 48.7 |

It is noted that less methyl isobutyl ketone is required, i.e. 80.5% of the methyl ethyl ketone, which also increases the terephthalonitrile yield by 14%.

Example 7

Table IV compares methyl isobutyl ketone and methyl ethyl ketone as leaching solvents. The same mixture as in Example 5 is used and sufficient solvent is added to leach away the isophthalonitrile, leaving solid terephthalonitrile for recovery by filtration. The leaching is carried out at 10° below the boiling point of each solvent.

TABLE IV

| Solvent | Leaching temp., ° C. | Solvent required, grams | Terephthalonitrile recovered, percent terephthalonitrile in feed |
|---|---|---|---|
| Methyl isobutyl ketone | 107 | 155 | 53.5 |
| Methyl ethyl ketone | 70 | 251 | 42.0 |

It is noted here that only 61.9% of methyl isobutyl ketone was required compared to methyl ethyl ketone, and the yield was higher by 27%.

What is claimed is:

1. A process for the separation of a phthalonitrile mixture comprised of isophthalonitrile and terephthalonitrile which comprises treating the mixture with a solvent in which one of the phthalonitriles is more soluble than the other, the solvent being selected from the group consisting of dimethyl formamide and methyl isobutyl ketone, and thereafter recovering at least one of the phthalonitriles in higher concentration than in the phthalonitrile mixture treated.

2. The process of claim 1 wherein the solvent is dimethyl formamide.

3. The process of claim 1 wherein the solvent is methyl isobutyl ketone.

4. The process of claim 1 wherein the phthalonitrile mixture is completely dissolved in the solvent, and the fat solvent is cooled to crystallize out one of the phthalonitriles.

5. The process of claim 1 wherein the mixture is treated with solvent sufficient to dissolve only a substantial portion of the more soluble phthalonitrile, thereby leaving a substantial portion of the other phthalonitrile undissolved and substantially purified.

6. The process of claim 1 wherein the isophthalonitrile/terephthalonitrile molar ratio in the mixture treated is less than about 4/1 and terephthalonitrile is crystallized out.

7. The process of claim 4 wherein the osophthalonitrile/terephthalonitrile molar ratio in the mixture treated is about 2/1, the solvent is methyl isobutyl ketone, the mixture is dissolved in a temperature range of about 50–130° C. and crystallized at a temperature of about 35–110° C., thereby causing terephthalonitrile to precipitate in substantially pure form.

8. The process of claim 4 wherein the isophthalonitrile/terephthalonitrile molar ratio in the mixture treated is about 2/1, the solvent is dimethyl formamide, the mixture is dissolved in a temperature range of about 40–152° C. and crystallized at a temperature of about 20–115° C., thereby causing terephthalonitrile to precipitate in substantially pure form.

9. The process of claim 1 wherein tolunitriles and unreacted xylenes are removed from the phthalonitrile mixture prior to treatment with the solvent.

References Cited
UNITED STATES PATENTS 2,846,462    8/1958    Hadley _____ 260—465

CHARLES B. PARKER, *Primary Examiner.*

S. T. LAWRENCE, *Assistant Examiner.*